United States Patent [19]
Fraas et al.

[11] Patent Number: 5,616,186
[45] Date of Patent: Apr. 1, 1997

[54] THERMOPHOTOVOLTAIC ELECTRIC GENERATOR USING LOW BANDGAP PHOTOVOLTAIC CELLS WITH A HYDROCARBON BURNER AND ENHANCED CATALYTIC INFRARED EMITTER

[75] Inventors: Lewis M. Fraas, Issaquah; Douglas J. Williams, Tacoma; John E. Samaras, Seattle, all of Wash.

[73] Assignee: JX Crystals Inc., Issaquah, Wash.

[21] Appl. No.: 529,734

[22] Filed: Sep. 18, 1995

[51] Int. Cl.$^6$ .......................... H01L 31/058; H02N 6/00
[52] U.S. Cl. .................................................. 136/253
[58] Field of Search .................................. 136/244–246, 136/253

[56]  References Cited

U.S. PATENT DOCUMENTS

| | | | |
|---|---|---|---|
| 3,433,676 | 3/1969 | Stein | 136/253 |
| 4,707,560 | 11/1987 | Hottel et al. | 136/253 |
| 4,776,895 | 10/1988 | Goldstein | 136/253 |
| 4,906,178 | 3/1990 | Goldstein et al. | 431/79 |
| 4,976,606 | 12/1990 | Nelson | 431/79 |
| 5,312,521 | 5/1994 | Fraas et al. | 136/253 |
| 5,356,487 | 10/1994 | Goldstein et al. | 136/253 |
| 5,383,976 | 1/1995 | Fraas et al. | 136/253 |
| 5,389,158 | 2/1995 | Fraas et al. | 136/244 |
| 5,401,329 | 3/1995 | Fraas et al. | 136/253 |
| 5,403,405 | 4/1995 | Fraas et al. | 136/253 |
| 5,439,532 | 8/1995 | Fraas | 136/253 |

Primary Examiner—Aaron Weisstuch
Attorney, Agent, or Firm—James Creighton Wray

[57]  ABSTRACT

A thermophotovoltaic generator provides a greater power output while maintaining a compact, simplistic structure. The generator includes a burner having adjustable fuel and air flows, an infrared radiation emitter suspended above the flame nozzle of the burner and a cylindrical receiver surrounding the emitter. The emitter is a conical infrared emitter connected to the burner by wires. The emitter is positioned above the burner nozzle such that the emitter is immersed in the generated hydrocarbon flame. The emitter material catalyzes combustion on its surface. Infrared energy radiated by the heated emitter is collected by a cylindrical receiver that completely encircles the emitter. The receiver includes a flexible circuit having an inner surface, an outer surface, opposite ends, top and bottom edges and bending regions. First and second rows of low bandgap cells are connected to the top and bottom edges of the circuit, respectively, away from the bending regions. Copper contact pads are placed on the top cell bonding side of the circuit. A thin, polyimide insulating layer is placed over the outer surface of the circuit and the contact pads, and a thin metal sheet is located under the insulating layer. Heat sinks having aluminum air cooling fins are bonded to the metal sheet. The receiver is rolled into a cylinder, with opposite ends of the circuit connected and with the inner surface of the circuit positioned closest to the emitter. By dramatically increasing the emitter surface area in the flame and by increasing the low bandgap cell packing density of the receiver, greater power outputs are realized.

27 Claims, 3 Drawing Sheets

FIG. 7
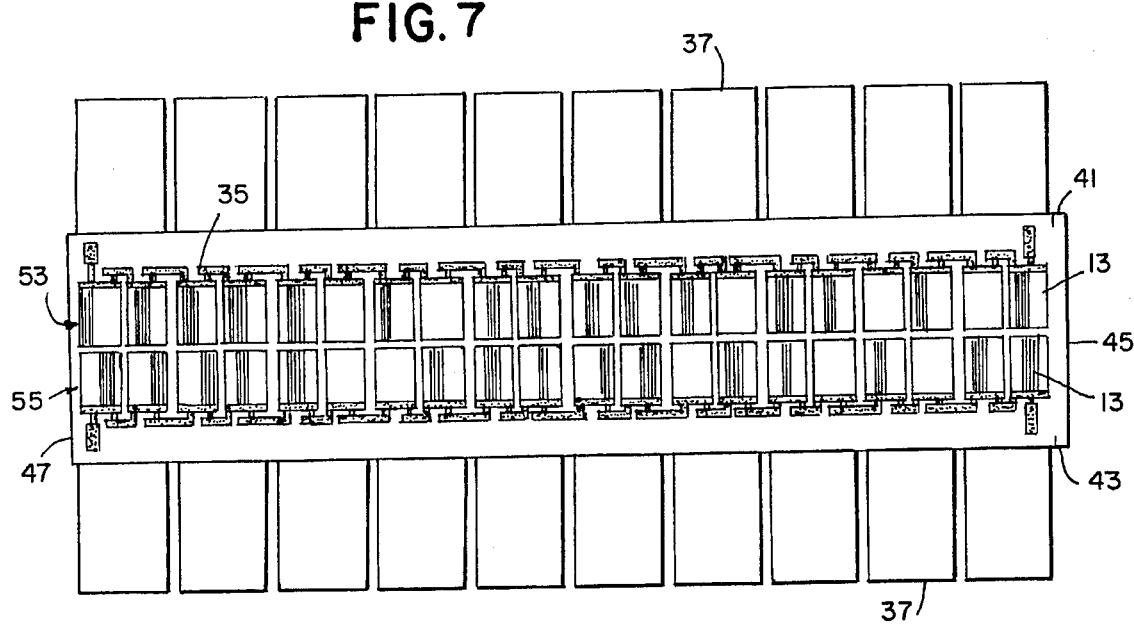
FIG. 8
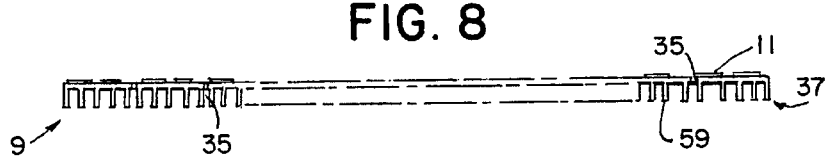
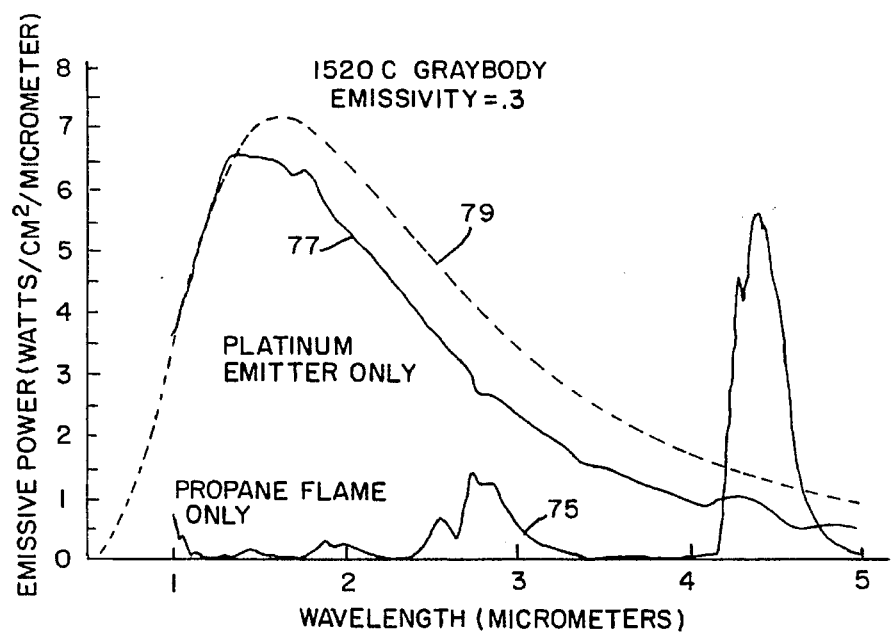
FIG. 9

THERMOPHOTOVOLTAIC ELECTRIC GENERATOR USING LOW BANDGAP PHOTOVOLTAIC CELLS WITH A HYDROCARBON BURNER AND ENHANCED CATALYTIC INFRARED EMITTER

BACKGROUND OF THE INVENTION

This invention relates to thermophotovoltaic power generators for converting fuel to electricity using no moving parts.

We have previously demonstrated that the use of low band gap photovoltaic cells such as GaSb cells instead of conventional silicon solar cells allows the use of lower temperature infrared emitters. Specifically, infrared emitters operating at temperatures in the range of 1700K to 2000K are well suited for use with GaSb cells. However, in our previously issued patents and our recently filed patent applications, we have described TPV generators designed for high efficiency conversion of fuel energy into electrical energy. This leads to burner configurations designed specifically for TPV incorporating heat exchangers, infrared filters, and special ceramic emitters. Although applications exist for these high efficiency TPV generators, it is also desirable to add TPV generators onto existing burner configurations where the burner is already designed and available for another primary purpose. Examples of such simple burners include candles or oil lamps designed primarily for lighting as well as gas burners designed for space heating or water heating. In mountain cabins, for example, propane wall heaters will be used in the winter for space heating. Why not generate electricity as well?

There is a need to incorporate low band gap cells into existing burner configurations in order to add the capability of electric power production to a burner designed primarily for another purpose. This adds utility to the existing burner while allowing the TPV circuit manufacturer to focus on his area of expertise while obtaining the use of a burner essentially for free.

We began the work which led to this patent application by observing that the yellow flame from a candle or oil lamp when surrounded by a small bracelet containing GaSb cells provided enough energy to operate a small transistor radio. Our analysis showed that the energy emitted by the flame was primarily in the infrared, peaking at 1.3 microns, ideal for the GaSb cells which responded out to 1.7 microns. Our analysis further showed that the infrared emitted originated from small carbon particles burning in the flame at a temperature of 2200K. However, although the flame temperature was definitely hot enough, the carbon particle density was very low, resulting in a relatively small amount of total emitted infrared energy. The result was a nice demonstration unit producing too little power to be economically viable. The power produced was only 0.1 Watts.

There is a need to dramatically increase emitter surface area in order to increase IR intensities, thereby increasing generated electrical power without dramatically increasing burner complexity or cost.

Attempts have been made to increase the amount of emitted TPV cell convertible infrared by inserting ceramic fiber mantles containing rare earth oxides into hydrocarbon burner flames. The idea is based on the fact that hot erbium oxide, for example, emits infrared at a wavelength of 1.55 microns which can be converted to electricity by a GaSb TPV cell. It is well known, however, that these ceramic mantles are very fragile. In addition, we have observed that the infrared emitted from an erbia mantle in a hydrocarbon flame contains large infrared energy peaks at 2.7 and 4.5 microns which are associated with gas phase $CO_2$, CO, and $H_2O$ molecular vibrations. It is therefore important to distinguish between combustion occurring on the emitter surface with the resultant emission of convertible IR and combustion occurring in the gas phase with the emission of non-useful IR.

There is a need to identify an IR emitter which is not fragile. Furthermore, this emitter should promote surface combustion reactions allowing for good energy transfer to its surface. Finally, it should emit primarily TPV cell convertible IR.

For improved economics and for expanded utility, needs have arisen for thermophotovoltaic generators having outputs in the range of one Watt or more and adequate heat removal. Efficient emitters must be capable of withstanding high temperatures and must efficiently couple energy from combustion into IR radiation usable by photovoltaic cells.

Needs exist for small, inexpensive thermophotovoltaic electric generators using conventional burners equipped with efficient IR emitters having a high IR power output well matched to existing low band gap cells.

There also is a need for electric power generation along gas pipe lines requiring small size, simple thermophotovoltaic units.

SUMMARY OF THE INVENTION

A thermophotovoltaic electric generator provides for efficient and inexpensive power generation by incorporating an adjustable fuel and air flow, an infrared radiation emitter suspended in the flame, and a low bandgap cell receiver having circuitry and provision for heat removal.

Low bandgap GaSb photovoltaic cells are sensitive to infrared radiation out to 1.7 microns and allow for the use of IR emitters operating at temperatures in the 1500° C. to 1600° C. range. The glowing carbon particles in a yellow candle or oil lamp flame can provide the required infrared radiation for the cells. Unfortunately, the power produced is insufficient for many applications because the carbon particle density is very small.

The design of a gas bunsen burner typifies the design of many small conventional gas burners. A bunsen burner differs from a candle or oil lamp in that there is provision for mixing air with the fuel in a region upstream from the flame region. Without mixing air in with the fuel upstream, the flame looks yellow because of carbon particle formation in the fuel rich flame region. However given adequate air mixing upstream, the flame turns blue. In this blue state, combustion is quite efficient and clean and the flame is very hot. However, there is almost no emitted convertible IR.

By suspending a solid emitter in a flame, the infrared radiation emitter area of the generator is dramatically increased. In a bunsen burner flame, the emitter is preferably a conical infrared radiation emitter suspended above the burner nozzle by wires. We have experimented with different potential IR emitter materials suspended in a bunsen burner flame. By placing a 1 $cm^2$ GaSb cell approximately 2 cm from the IR emitter cone, we were able to measure the amount of convertible IR emitted by the test emitter cone. We have discovered that platinum and platinum/rhodium alloys make excellent TPV emitters. Besides being much more durable than erbia emitter mantles, a platinum emitter produces over twice the current in the GaSb test cell, indicating that it is emitting over twice as much TPV cell convertible IR.

In one embodiment of our invention designed for use with a bunsen burner, the emitter is a foil cone formed by wrapping a cone using platinum or platinum/rhodium foil. In another embodiment, the emitter is a wire or screen emitter spiralled into a cone-shape.

Platinum and platinum/rhodium alloys are well-suited for use as infrared radiation emitters in thermophotovoltaic generators. Emitters having these alloys do not melt at temperatures around 1500 degrees Celsius, do not oxidize at temperatures around 1500 degrees Celsius, and efficiently couple energy from combustion into radiation via a catalytic surface reaction. Platinum emitters catalyze the combustion, which results in more complete combustion and in better heat transfer to the platinum emitter surface. In addition to the above properties of platinum/rhodium alloys, we have also discovered that the spectral emissivity is surprisingly very well suited for TPV IR emitters. Specifically, the long wavelength emissivity for platinum is very low, thereby suppressing the amount of non-useful IR emitted whereas the emissivity monotonically increases for shorter wavelengths, enhancing the amount of convertible short wavelength IR emitted.

For a TPV generator designed around a bunsen burner, the receiver is a cylinder having a high cell packing density and sufficient heat removal. First and second rows of low bandgap cells are bonded to the top edge and the bottom edge of the circuit, respectively. In preferred embodiments, the circuit is a flexible circuit having multiple bending regions. The cells are bonded to the circuit away from the bending regions. Ends of the circuit are connected to form a continuous receiver extending completely around the emitter.

The outer surface of the circuit has heat sinks connected for efficient heat removal. The heat sinks are preferably finned aluminum extrusions. Heat flows from the row of low bandgap cells, through an insulation spreading and into the heat sinks, where the heat is ultimately removed by convective air cooling.

The circuit has copper contact pads positioned on the top cell bonding side of the circuit. An insulating layer is positioned under the contact pads and an aluminum or copper sheet positioned under the insulating layer. The heat sinks are bonded to the aluminum or copper sheet. In preferred embodiments, the contact pads are made of copper, the insulating layer is a thin, polyimide insulation layer, and the heat sinks are aluminum heat sinks The receiver is rolled into a cylinder, with opposite ends of the circuit connected. The inner surface of the circuit is closest to the emitter and the air cooling fins fan away from the emitter. The low band gap cells collect the infrared radiation released by the emitter. Heat flows from the cells through the insulation layer on the circuit and spreads in the aluminum foil layer. Ultimately, the waste heat reaches the heat sinks, where the heat is removed by convective air cooling.

The bunsen burner TPV generator just described may be ideal for use on gas pipe lines for operating data collection and radio transmitter equipment.

In another embodiment, a larger TPV generator can be built around a gas ribbon burner similar to the ribbon burners used in small home heating furnaces. In this embodiment, the platinum/rhodium alloy emitter becomes a v-shaped ribbon suspended along the ribbon flame and two cell circuits are arrayed facing the ribbon emitter along its front and back. The exhaust from the ribbon burner can be routed through a heat exchanger mounted on the wall. This unit would then operate as a wall heater equipped with a TPV battery charger. Such a unit would be ideal for use in off-grid mountain cabins in colder climate regions.

A thermophotovoltaic generator apparatus includes a burner for generating a hydrocarbon flame, a catalytic emitter connected to the burner and positioned in the hydrocarbon flame for emitting infrared radiation when heated by the flame, and a receiver positioned around the emitter for receiving the infrared radiation and for converting the infrared radiation to DC electric power. The receiver incorporates low bandgap cells that are responsive to the infrared radiation emitted by the emitter.

A fuel source and an air source are connected to the burner for providing fuel and air to the burner, respectively. The burner has an adjustable fuel flow and an adjustable air flow for maintaining higher levels of radiated power. In preferred embodiments, the burner is a gas bunsen burner or a gas ribbon burner.

The emitter is an infrared radiation emitter that includes a support structure connected to the burner and an infrared radiation emitter foil suspended by the support structure. Platinum/rhodium alloy emitters are preferred, as they catalyze the combustion, thereby resulting in more complete combustion and better heat transfer to the platinum/rhodium emitter surface via the catalytic surface reaction.

The support structure has multiple legs extending from the upper portion and connecting the upper portion to the burner. In one preferred embodiment, metal foil is used as the IR emitter and it is suspended by the upper portion of the support structure. The support structure is preferably made of platinum wire, and the foil is preferably selected from the group consisting of platinum foil and platinum/rhodium foil.

In another preferred embodiment, the emitter has a support structure connected to the burner and a wire or screen wrapped around the support structure, instead of a foil. The wire or screen is preferably made of a material selected from the group of materials consisting of platinum and platinum/rhodium alloys.

In preferred embodiments, the emitter is a solid emitter. Its surface must be coated with platinum or platinum/rhodium alloys. However, because of the high cost of platinum/rhodium, these IR emitter materials may be coated onto another cheaper refractory material such as tungsten.

The receiver includes a circuit having a top edge, a bottom edge, an inner surface, and an outer surface. A first row of low bandgap cells is connected to and extends along the top edge of the circuit. A second row of low bandgap cells is connected to and extends along the bottom edge of the circuit.

Contact pads are positioned on the circuit, and heat sinks are connected to the outer surface of the circuit. For efficient heat removal, a thin insulating layer is positioned under the contact pads and the outer surface of the circuit and an aluminum sheet is positioned under the insulating layer. The heat sinks are then bonded to the aluminum sheet. In preferred embodiments, the contact pads are made of copper, the insulating layer is a thin, polyimide insulation layer, and the heat sinks are aluminum heat sinks having aluminum air cooling fins.

In another preferred thermophotovoltaic generator apparatus, the burner is a ribbon burner having multiple flame ports. Multiple emitters are positioned over the ports such that flames projecting from the burner immerse the emitters. Each emitter is preferably constructed as a v-shaped ribbon. The v-shaped ribbon emitters each have a first part and a second part. The receiver includes a first cell circuit facing the first part of the v-shaped emitter and a second cell circuit facing a second side of the emitter. A fuel source is connected to the burner for providing fuel to the burner. A heat exchanger is positioned near the burner for routing exhaust away from the burner. A battery is connected to the receiver for receiving a generated current.

These and further and other objects and features of the invention are apparent in the disclosure, which includes the above and ongoing written specification, with the claims and the drawings.

BRIEF DESCRIPTION OF THE DRAWINGS

FIG. 7 shows the flexible circuit of FIG. 6 having first and second rows of low bandgap cells connected to the top and bottom edges of the circuit, respectively.

FIG. 8 is a side view of the circuit/low bandgap cell combination of FIG. 7 having heat sinks with air cooling fins bonded to the circuit.

FIG. 9 graphically shows the spectral output of a bunsen burner flame over the range from 0.5 to 5 microns with and without a platinum wire coil emitter.

DETAILED DESCRIPTION OF THE PREFERRED EMBODIMENTS

Figure 1:
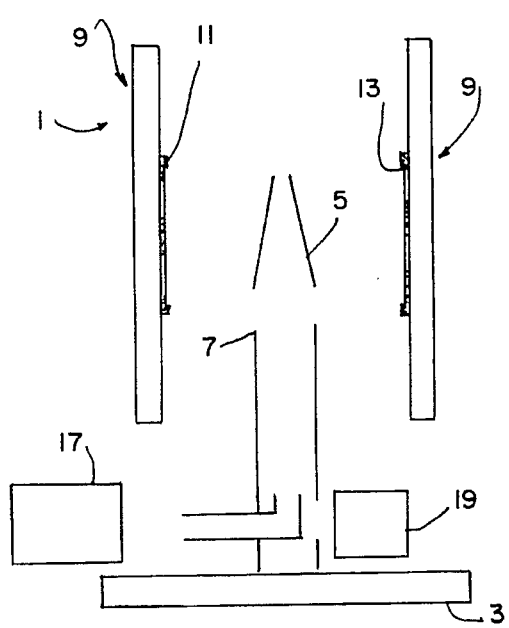
FIG. 1 is a vertical section through the thermophotovoltaic generator having a burner, an infrared emitter suspended in the flame generated by the burner, and a cylindrical receiver surrounding the emitter.
Figure 2:
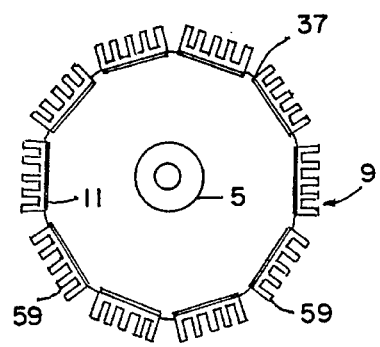
FIG. 2 is a horizontal section through the thermophotovoltaic generator of claim 1.

As shown in FIGS. 1 and 2, a thermophotovoltaic generator 1 includes a burner 3 for generating a hydrocarbon flame. An emitter 5, which is preferably a solid infrared radiation emitter, is suspended above the burner nozzle 7 through which the generated hydrocarbon flame passes. The emitter 5 is preferably made of a catalytic infrared radiation emitter material, such as platinum. The emitter 5 is positioned above the nozzle 7 such that the hydrocarbon flame completely or substantially immerses the emitter 5. By increasing the surface area of the emitter 5 in the flame, higher levels of radiated energy are released, resulting in higher power outputs. When the emitter 5 is immersed in the flame, infrared radiation energy is released and collected by a receiver 9. As shown in a first embodiment in FIG. 2, the receiver 9 is preferably a cylindrical receiver that completely surrounds the emitter 5. The receiver 9 collects the infrared radiation and converts the infrared radiation to DC electric power. The receiver 9 includes a circuit 11, low bandgap cells 13 that are responsive to the infrared radiation emitted by the emitter 5, and provisions for heat removal.

As shown in FIG. 1, the burner 3, which can be a bunsen burner, has a fuel source 17 connected to the burner 3 for providing fuel to the burner 3. An air source 19 is also connected to the burner 3 for providing air to the burner 3. The air and fuel are mixed in the burner for generating a hydrocarbon flame. Preferably, the burner has an adjustable fuel flow and an adjustable air flow for maintaining higher levels of radiated power.

Figure 3:
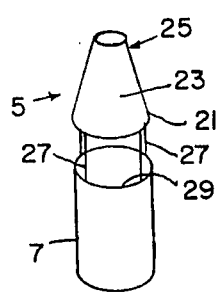
FIG. 3 shows an infrared emitter of the present invention having a foil cone.

As shown in FIGS. 1 and 2, the emitter 5 is a conical emitter suspended above the burner nozzle 7. FIG. 3 shows a preferred embodiment of the emitter 5 having a conical shape. The emitter 5 preferably includes a support structure 21 connected to the burner 3 and an infrared radiation emitter foil 23 wrapped around the support structure 21. The support structure 21 includes a conical upper portion 25 and multiple legs 27 extending from the upper portion 25. The foil 23 is wrapped around the upper portion 25. In preferred embodiments of the present invention, the foil 23 is a platinum foil or a platinum/rhodium foil. The legs 27 connect the upper portion 25 of the support structure 21 to the burner 3 and suspend the foil 23 or other infrared generating-region of the emitter 5 above the burner nozzle 7. The legs 27 suspend the foil 23 surrounding the upper portion 25 at a height such that the flame, when generated, completely immerses, or substantially immerses the foil 23. In one embodiment, as shown in FIG. 3, the legs 27 are connected to the top 29 of the burner nozzle 7. In preferred embodiments, the support structure 21, including the legs 27, are made of platinum wire. The entire emitter 5, including the foil 23 and the support structure 21, needs to be made of materials that do not melt or oxidize at high temperatures, such as temperatures in the range of 1500 degrees Celsius.

Figure 4:
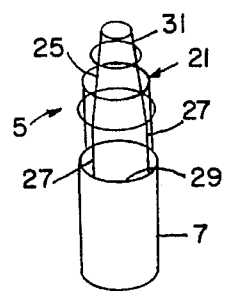
FIG. 4 shows an infrared emitter of the present invention having a wire/screen cone.

FIG. 4 shows another preferred embodiment of the conical emitter 5. The emitter 5 includes a support structure 21, as described above, connected to the burner 3 and a wire or screen 31 wrapped around the upper portion 25 of the support structure 21. The wire or screen 31 is preferably made of platinum and platinum/rhodium alloys.

Figure 5:
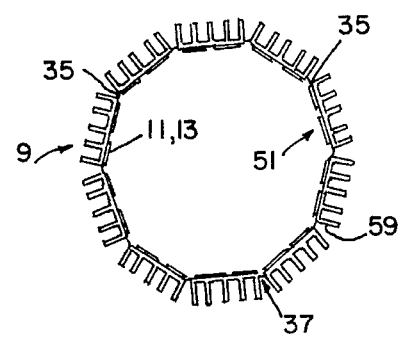
FIG. 5 shows a cylindrical receiver of the present invention having a flexible circuit, rows of low bandgap cells attached to the circuit, and heat sinks bonded to the outer surface of the circuit.

FIG. 5 shows a preferred receiver 9 for use in thermophotovoltaic generators. The receiver 9 is constructed by first bonding low bandgap cells 13 to a flexible circuit 11 having bending regions 35. Next, heat sinks 37 are attached to the outer surface of the circuit 11 for heat removal. Finally, the receiver 9 is rolled into a cylinder by bending the circuit 11 along its bending regions 35 and connecting the ends of the circuit 11. The receiver 9 is easy to make, has efficient heat removal, and includes a high cell packing density.

FIG. 5 shows a cylindrical receiver 9 having forty low bandgap cells 13 and ten bending regions 35. When the cells 13 are low bandgap cells such as GaSb cells, power outputs in excess of 5.5 Watts are achieved when a platinum emitter is immersed in the flame. Any number of cells is possible.

Figure 6:
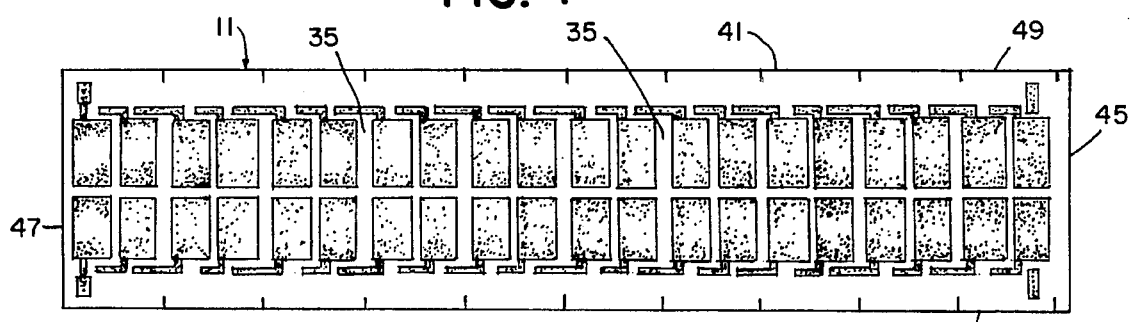
FIG. 6 shows the flexible circuit of FIG. 5.

FIG. 6 is a preferred flexible circuit 11 for incorporation in the receiver 9. The circuit 11 has a top edge 41, a bottom edge 43, a first end 45, a second end 47, an outer surface 49, an inner surface 51 (see FIG. 5) and bending regions 35. As shown in FIG. 7, a first row 53 of low bandgap cells 13 is bonded below the top edge 41 of the circuit 11 and a second row 55 of low bandgap cells 13 is bonded above the bottom edge 43 of the circuit 11. The low bandgap cells 13 are connected to the circuit 11 away from the bending regions 35. That allows for high packing density when the circuit 11 is oriented in a cylindrical configuration.

As shown in FIGS. 7 and 8, provisions for heat removal are incorporated in the receiver 9. Contact pads (not shown), preferably made of copper, are connected to the top cell bonding side. A thin insulating layer, such as a polyimide insulating layer, is located under the outer surface of the circuit and the contact pads. A thin aluminum or copper sheet is located under the insulating layer. The aluminum layer is bonded to heat sinks 37. Preferably, the heat sinks 37 include aluminum air cooling fins 59.

An assembled thermophotovoltaic generator 1 preferably has the receiver 9 rolled in a cylinder, with the first and second ends 45, 47 of the circuit 11 of the receiver 9 connected. The inner surface 51 of the circuit 11 is closest to the emitter 5; the cooling fins 59 extend outward from the outer surface 49 of the circuit 11, away from the emitter 5.

The flame generated by the burner 3 immerses the conical emitter 5, causing the emitter 5 to release infrared energy. The low bandgap cells 13 of the receiver 9 collect the energy. The energy is converted in the receiver 9 to DC electrical power. Heat flows from the low bandgap cells 13 through the insulating layer and is spread along the aluminum layer. The heat is eventually removed through the heat sinks 37 by convective air cooling.

The flame energy required for operation of the TPV unit shown in FIGS. 1 through 8 can be provided by a small gas bunsen burner. Spectral measurements of the flame from a bunsen burner are shown in FIG. 9 for the cases with and without a platinum IR emitter. The lowest curve 75 is for the case without the platinum emitter. Note that without the catalytic IR emitter, the energy emitted in the cell response range from 1 to 1.7 microns is negligible, whereas a large fraction of the flame energy is in the infrared spectral line at 4.5 microns associated with gas phase $CO_2$ molecular vibrations. However, when a platinum wire IR emitter is located in the flame, a large broad IR emission band 77 centered at 1.3 microns appears. The ratio of convertible IR in the range from 1 to 1.7 microns to non-useful IR at 4.5 microns has now dramatically increased. The top curve 79 in FIG. 9 is the calculated emission from a gray body with a flat emittance of 0.3 operating at a temperature of 1520° C. Comparing curve 79 to curve 77 for the platinum emitter shows that the non useful IR energy emitted beyond 1.7 microns is suppressed for the platinum emitter relative to a gray body emitter.

Figure 10:
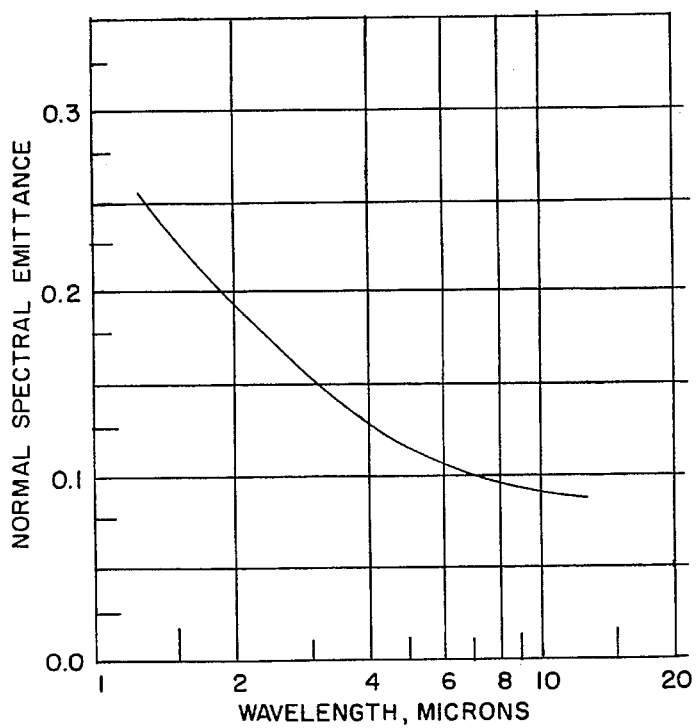
FIG. 10 shows the normal spectral emittance of platinum over the range from 1 to 20 microns.

FIG. 10 shows the fortuitous normal spectral emittance for platinum. The monotonic fall-off in emittance for wavelengths longer than 1.5 microns is the reason that the platinum emitter suppresses the longer wavelength non-useful IR emission relative to the gray body case.

FIGS. 11–14 show another embodiment of the present invention wherein the burner 83 is a ribbon burner having multiple flame ports 85. As shown in the Figures, a wall heater 87 having a ribbon burner 83, a platinum infrared emitter 89, and a thermophotovoltaic battery charger are connected to a fuel tank 93. Emitters 89 are positioned over the ports 85 in the burner 83 such that flames projecting from the burner 83 immerse the emitters 89. A receiver 95 including rows of thermophotovoltaic cells surround the burner 83 and emitter 89. As the flame immerses the emitter 89, infrared energy released by the emitter 89 is captured by the surrounding low bandgap photovoltaic cells. The cells of the receiver 95 produce a current that is delivered to the battery 91. Heat generated by the flame passes through a heat exchanger 101 in the wall heater 87.

Figure 13:
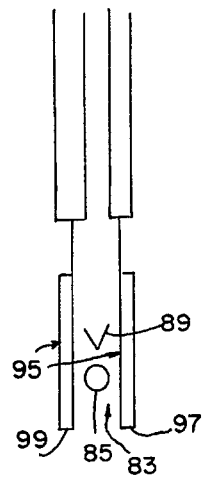
FIG. 13 shows a platinum infrared emitter positioned above a port in the ribbon burner.
Figure 12:
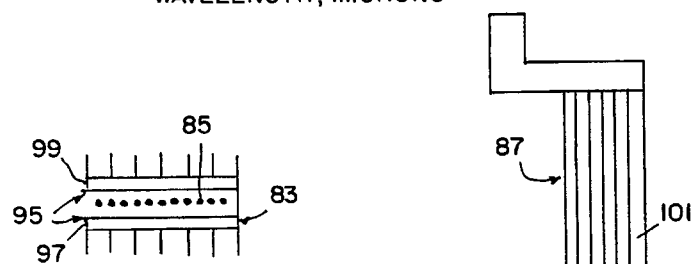
FIG. 12 is a plan view of the ribbon burner having multiple flame ports and rows of thermophotovoltaic cells surrounding both sides of the burner.
Figure 14:
FIG. 14 is a plan view of the wall mounted heat exchanger of the present invention.
Figure 11:
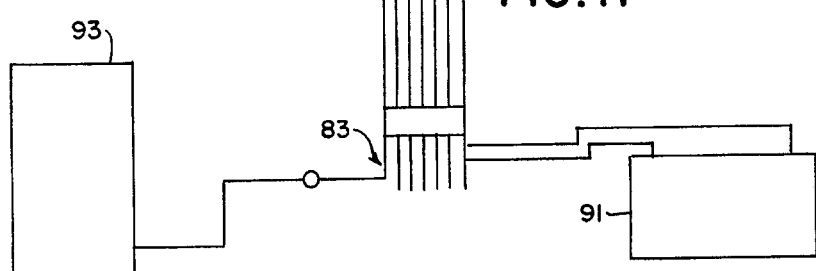
FIG. 11 shows a wall heater embodiment of the present invention including a heat exchanger, a ribbon burner, platinum infrared emitters, a receiver surrounding the emitter, a thermophotovoltaic battery charger and a fuel source.

As shown in FIG. 13, the emitter 89 is preferably a platinum/rhodium alloy emitter constructed as a v-shaped ribbon. The emitter 89 is suspended along the ribbon burner 83 above the ports 85 where the flames exit. The receiver 95 includes cell circuits 97, 99 that are arrayed facing the ribbon emitter 89.

In preferred embodiments, a first cell circuit 97 faces a first side of the v-shaped emitter 89 and a second cell circuit 99 faces a second side of the emitter 89. The exhaust from the ribbon burner 83 can be routed through a heat exchanger 101 mounted on the wall. This unit would then operate as a wall heater equipped with a TPV battery charger.

While the invention has been described with reference to specific embodiments, modifications and variations of the invention may be constructed without departing from the scope of the invention, which is defined in the following claims.

We claim:

1. A thermophotovoltaic generator apparatus comprising a burner for generating a hydrocarbon flame, a catalytic emitter positioned in the hydrocarbon flame for emitting infrared radiation when heated by the flame, and a receiver positioned around the catalytic emitter for receiving the infrared radiation and for converting the infrared radiation to DC electric power, the receiver further comprising low bandgap photovoltaic cells that are responsive to the infrared radiation emitted by the catalytic emitter, said catalytic emitter serving to catalyze combustion thereby increasing convertible IR energy intensity.

2. The apparatus of claim 1, wherein the catalytic emitter is fabricated from a platinum/rhodium alloy.

3. The apparatus of claim 1, wherein the catalytic emitter comprises a refractory material having a platinum/rhodium alloy coating.

4. The apparatus of claim 1, further comprising a fuel source connected to the burner for providing fuel to the burner and an air source connected to the burner for providing air to the burner, and wherein the burner has an adjustable fuel flow and an adjustable air flow.

5. The apparatus of claim 4, wherein the burner is a bunsen burner.

6. The apparatus of claim 1, wherein the emitter is a solid infrared radiation emitter.

7. The apparatus of claim 1, wherein the emitter is a conical infrared radiation emitter.

8. The apparatus of claim 1, wherein the emitter is a conical emitter further comprising a support structure connected to the burner and an infrared radiation emitter foil wrapped around the support structure.

9. The apparatus of claim 8, wherein the support structure further comprises a conical upper portion and multiple legs extending from the upper portion and connecting the upper portion to the burner, and wherein the foil is wrapped around the upper portion of the support structure.

10. The apparatus of claim 8, wherein the support structure is made of platinum wire.

11. The apparatus of claim 8, wherein the foil is selected from the group consisting of platinum foil and platinum/rhodium foil.

12. The apparatus of claim 1, wherein the emitter further comprises a support structure connected to the burner and a wire or screen wrapped around the support structure.

13. The apparatus of claim 12, wherein the wire or screen is made of a material selected from the group of materials consisting of platinum and platinum/rhodium alloys.

14. The apparatus of claim 1, wherein the receiver further comprises a circuit having a top edge, a bottom edge, an inner surface and an outer surface, a first row of low bandgap cells connected to and extending along below the top edge of the circuit, and a second row of low bandgap cells connected to and extending along above the bottom edge of the circuit.

15. The apparatus of claim 14, wherein the circuit is a flexible circuit having a first end, a second end and multiple bending regions positioned between the first end and the second end, and wherein the first end is connected with the second end to form a continuous receiver extending completely around the emitter.

16. The apparatus of claim 14, further comprising contact pads positioned on the circuit and heat sinks connected to the outer surface of the circuit.

17. The apparatus of claim 16, further comprising an insulating layer positioned under the contact pads, an aluminum sheet positioned under the insulating layer, and wherein the heat sinks are bonded to the aluminum sheet.

18. The apparatus of claim 17, wherein the contact pads are made of copper, the insulating layer is a thin, polyimide insulation layer, and the heat sinks are aluminum heat sinks.

19. The apparatus of claim 16, wherein the heat sinks further comprise finned aluminum extrusions.

20. The apparatus of claim 1, wherein the burner is a ribbon burner having multiple flame ports, and wherein the emitter further comprises multiple emitters positioned over the ports such that flames projecting from the burner immerse the emitters.

21. The apparatus of claim 20, wherein each emitter is preferably constructed as a v-shaped ribbon.

22. The apparatus of claim 21, wherein the v-shaped ribbon emitter has a first part and a second part, and wherein the receiver further comprises a first cell circuit facing the first part of the v-shaped emitter and a second cell circuit facing a second side of the emitter.

23. The apparatus of claim 20, further comprising a fuel source connected to the burner for providing fuel to the burner, a heat exchanger positioned near the burner for routing exhaust away from the burner and a battery connected to the receiver for receiving a generated current.

24. A thermophotovoltaic generator method comprising suspending a catalytic emitter above a region of a burner where a generated flame exits such that the generated flame immerses the emitter, positioning a receiver around the emitter, producing a flame by combining hydrocarbon fuel and air in the burner, heating the emitter to produce infrared energy, collecting the infrared energy in the receiver, removing heat through heat fins extending from the receiver, and converting the infrared energy to DC electric power.

25. The method of claim 24, wherein the producing a flame step further comprises mixing the air with the fuel in a region upstream from a region where the flame is provided.

26. A thermophotovoltaic generator apparatus comprising a burner for generating a hydrocarbon flame, an emitter connected to the burner and positioned in the hydrocarbon flame for emitting infrared radiation when heated by the flame, a receiver positioned around the emitter for receiving the infrared radiation and for converting the infrared radiation to DC electric power, a fuel source connected to the burner for providing fuel to the burner and an air source connected to the burner for providing air to the burner, wherein the burner has an adjustable fuel flow and an adjustable air flow, wherein the emitter is a conical infrared radiation emitter further comprising a support structure connected to the burner having a conical upper portion and multiple legs extending from the upper portion and connecting the upper portion to the burner, and wherein the receiver further comprises a flexible circuit having an inner surface, an outer surface, a top edge and a bottom edge, a first row of low bandgap cells connected to and extending along below the top edge of the circuit, a second row of low bandgap cells connected to and extending along above the bottom edge of the circuit, contact pads positioned on the circuit, an insulating layer positioned under the contact pads, a metal sheet positioned under the insulating layer, and heat sinks bonded to the metal sheet, the heat sinks further comprising aluminum finned extensions.

27. A thermophotovoltaic generator apparatus comprising a ribbon burner having multiple flame ports for generating hydrocarbon flames, catalytic emitters positioned in the hydrocarbon flames for emitting infrared radiation when heated by the flames, a receiver positioned around the emitter for receiving the infrared radiation and for converting the infrared radiation to DC electric power, a fuel source connected to the burner for providing fuel to the burner, a battery connected to the receiver for receiving a generated current and a heat exchanger positioned adjacent the ribbon burner for routing exhaust away from the burner, wherein each catalytic emitter is a v-shaped infrared radiation emitter further comprising a first part and a second part, each emitter serving to catalyze combustion and thereby increasing convertible infrared energy intensity, wherein the receiver further comprises a first cell circuit facing the first part of the v-shaped emitter and a second cell circuit facing a second side of the emitter, and wherein each cell circuit further comprises low bandgap cells that are responsive to the infrared radiation emitted by the catalytic emitters.

* * * * *